Patented Dec. 24, 1946

2,412,993

UNITED STATES PATENT OFFICE 2,412,993

POLYMERIC MATERIALS

Arthur W. Larchar, Mendenhall, Pa., assignor to E. I. du Pont de Nemours & Company, Wilmington, Del., a corporation of Delaware No Drawing. Application July 19, 1943, Serial No. 495,349

12 Claims. (Cl. 260—72)

This invention relates to polymeric materials and more particularly to the manufacture of modified polymers of the nylon type.

The polyamides with which this invention is concerned are those obtained from reactants of the general kind described in United States Patents 2,071,250, 2,071,253, and 2,130,948. Organic acid solutions of these polyamides react with formaldehyde and alcohol to form N-alkoxymethyl polyamides wherein the amide group

is converted to the alkoxymethyl group

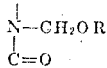

where R is an alkyl group. The reaction presumably takes place through the etherification by the alcohol of the methylol groups first formed by the aldehyde. In the polyamides described herein and in the above mentioned patents the amide groups are an integral part of the polymer chain.

Methods for precipitating the modified polymers and for recovering the acid solvent, unreacted alcohol (which is best used in excess) and unreacted formaldehyde, present difficulties both with regard to the nature of the precipitate obtained and with regard to the recovery of the acid solvent. Thus when isolation of the polymer is effected by diluting the reaction mixture with aqueous acetone followed by precipitation with aqueous ammonia, and when formic acid is the solvent and methanol is the alcohol, the mother liquor is a complex mixture containing acetone, water, methylal, ammonium formate, and hexamethylene tetramine. Separation of this mixture is difficult and recovery of formic acid and formaldehyde in forms which permit re-use in the process is impractical. Isolation of the N-alkoxymethyl polyamides can also be obtained by pouring the reaction mixture into a large quantity of water, but the polymer separates as a slimy precipitate which gradually hardens to a stiff doughy mass. In order to wash this material and break it down into a form suitable for use, it is necessary to work it mechanically, for example on wash rolls. Recovery of acid from the dilute aqueous liquor is difficult. Due to the large excess of water the acid cannot be completely esterified and extraction methods are expensive. These known methods for isolation of the polymer from the reaction mixture fail to effect complete removal of polymer from the mother liquor and thereby introduce a further serious problem with respect to reagent recovery since in most systems the polymer precipitates during mother liquor distillation and fouls heat transfer surfaces.

This invention has as an object a new and improved method for making N-alkoxymethyl polyamides. A further object is a method for obtaining the alkoxymethyl polyamides from the reaction mixture in a better and more useful physical form than they have been obtained hitherto. A further object is a method for obtaining essentially complete precipitation of N-alkoxymethyl polyamides from reaction mixtures containing them. A still further object is a method of precipitation and isolation of the modified polymer by means of which the excess reagents in the reaction mixture can be easily and cheaply recovered. Other objects will appear hereinafter.

The above objects, generally speaking, are accomplished by precipitating the N-alkoxymethyl polyamide from the above described reaction mixture by means of an ester. In the most valuable embodiment of the invention whereby the previously referred to advantages in the recovery of the reagents are obtained in addition to the improved physical form of the precipitate, the precipitant is the monohydric alcohol ester of a mono-basic organic acid wherein the ester is that of the alcohol and organic acid solvent used in making the N-alkoxymethyl polyamide.

I have discovered that granular easily separated precipitates of the N-alkoxymethyl polyamides are obtained by their precipitation from the reaction mixture by means of esters. I have further found that when the precipitation and isolation is conducted as outlined herein, and where the ester contains the same acid radical as the solvent acid and the same alkyl radical as the reacting alcohol, that the prior practice of obtaining these modified polyamides is improved by reason of the convenient and economical recovery of the reagents made possible. This preferred practice is shown by the following procedure wherein formic acid is illustrative of a suitable organic acid solvent for the polyamide and methyl alcohol of one of the alcohols that can be used in making the N-alkoxymethyl polyamides. Thus, when N-methoxymethyl polyhexamethylene adipamide is obtained by reacting a formic acid solution of polyhexamethylene adipamide with methyl alcohol and formaldehyde the precipitant used is methyl formate.

After the precipitated N-methoxymethyl polyhexamethylene adipamide is removed the mother liquor (consisting principally of formic acid, unreacted alcohol, and formaldehyde together with the methyl formate used as the precipitant) is distilled. During the distillation the methyl alcohol and formic acid also form methyl formate. No further separation is required as would be the case if another ester had been used as the precipitant. In the latter instance the resulting mixture of esters could be used as precipitant, but only a portion thereof would be required, and it is undesirable to continuously recover the alcohol and acid as an ester in admixture with another ester.

The precipitated polymer constitutes the major portion of the polymer in the reaction mixture. The solvent formic acid and most of the unreacted methanol are recovered as methyl formate as indicated above. In practice the distillation is interrupted, after distillation of the methyl formate and prior to removal of the methanol in excess of that required to obtain the methyl formate, and cooled. This causes the small amount of remaining polymer to precipitate from the still residue. The precipitate is removed and the remaining methanol recovered and the formaldehyde concentrated by continued distillation.

In carrying out the invention the reaction mixture in which the N-alkoxymethyl polyamide is formed is transferred promptly to an agitated precipitation tank. When the reaction mixture is that obtained from a formic acid solution of the polyamide containing methyl alcohol and formaldehyde, the N-alkoxymethyl polyamide is precipitated by addition of methyl formate or a fraction rich in methyl formate (i. e., the ester recovered from another run). The following procedure (wherein as elsewhere the parts are by weight based on one part by weight of polyamide) gives a granular, fast settling precipitate: Eight and one-half parts of precipitant ester or ester fraction is added to the agitated reaction mixture at a rate sufficiently slow to avoid the formation of a permanent precipitate. The use of several inlet ports or of a distributing head is advantageous for this purpose and prevents localized concentration of ester. A period of 3-5 minutes is usually satisfactory for extension (i. e., dilution without precipitation) of the polymer solution, but if ester is added too rapidly at this stage, large lumps of polymer tend to be thrown out and do not re-dissolve. The polymer is then precipitated by adding more precipitant ester very rapidly—preferably within 30 to 60 seconds. This step, i. e., the actual precipitation of polymer from the extended solution, should be carried out as rapidly as possible; slow precipitation gives a mush of gel-like particles which settle very slowly and which form a matted cake on centrifugation. Particle size is influenced by the degree of agitation during precipitation; the stronger the agitation the smaller the size. With the proportions given above, precipitation is about 95% complete.

It is desirable to slurry the precipitation mixture for at least 10 minutes after precipitation to harden the polymer granules. The polymer can be separated from the mother liquor by conventional means, such as decantation, filtration, or centrifugation. Use of a closed-type centrifuge is preferred.

The mother liquor obtained by precipitation of an N-methoxymethyl polyhexamethylene adipamide reaction mixture contains methyl formate, formic acid, formaldehyde, methanol, methylal, water, and dissolved polymer. Batch distillation gives an effective separation. This can be carried out in standard commercial equipment which should, however, include properly refrigerated condensers and vents to prevent excessive loss of low boiling constituents, such as methyl formate and methylal. Substantially all of the total formate content of the liquor, i. e., methyl formate plus free formic acid, can be recovered as methyl formate if the distillation is run at a moderate rate. With this system it is preferred not to use a catalyst, such as sulfuric acid, to promote esterification of the formic acid.

If the methyl formation made in the process, i. e., that equivalent to the solvent formic acid used in the reaction step, is wanted in a pure state, it is desirable to maintain a high reflux ratio during the first part of the ester cut. This is unnecessary for that portion of the methyl formate fraction recycled to the precipitation step since this need not be pure. A methylal-methanol azeotrope is taken off next. It has been found that the retained polymer remains in solution up to this point but begins to throw out on the heating surfaces as the distillation is carried into the methyl alcohol fraction. Accordingly, it is desirable to halt the distillation after removal of the methyl formate and methylal and to cool the residue. Upon standing, preferably for at least 24 hours, most of the polymer precipitates and can be removed by filtration. Distillation can then be resumed and the unreacted methanol stripped off. The residue is then an aqueous solution containing up to about 25% formaldehyde. Under circumstances where this dilute solution cannot be used directly, concentration is necessary. Over 80% of the aldehyde can be recovered as a 35–40% solution by distillation of the aqueous residue under a pressure of about 60 lbs./sq. in. gauge. If necessary, the aldehyde concentration can be increased to 80% or higher by vacuum stripping of water from the pressure distillate.

The invention is further illustrated by the following examples:

*Example I*

One part of fiber-forming polyhexamethylene adipamide, cut to pass a ¼" screen, was dissolved at 60° C. in 2 parts of 90% (by weight) formic acid in a closed, corrosion resistant vessel equipped with an anchor type stirrer and reflux condenser. About 90 minutes was required for complete solution. A solution of 1.2 parts of 80% formaldehyde, 1 part of methanol, and sufficient sodium hydroxide to make the mix alkaline to litmus, was made and heated to 60° C. in a closed, agitated, refluxed vessel. This required about 20 minutes. One-third part of methyl formate was then added to the aldehyde solution to prevent gelation of the reaction mixture. The aldehyde solution was then added to the polyamide solution with good agitation. Addition was slow at the start but quite rapid after the first minute, and was completed in 3.5 minutes. The temperature of the reaction mixture was maintained at 60° C. Nineteen minutes later, 1 part of methanol was added, and the reaction continued for 11 minutes, bringing the total reaction time measured after completion of the aldehyde addition to 30 minutes.

The reaction mixture was passed through a strainer into an agitated precipitation tank.

Eight and one-half parts of methyl formate was added over a 4–5 minute period without forming a permanent precipitate. After thus extending the solution, 14 parts of methyl formate was added in 40–60 seconds, precipitating the polymer in the form of fine granules. After slurrying the precipitation mixture for 10 minutes the polymer was separated from the mother liquor by centrifugation. Less than 5% of the total polymer remained in solution.

The polymer, N-alkoxymethyl polyhexamethylene adipamide, was thoroughly washed and was then dried at 50° C. to give a white granular, free flowing product. It contained 7.5% by weight of methoxyl groups, 1.4% methylol groups, corresponding to 35–36% substitution of the original amide groups in the polyamide. The product was soluble in hot 80% ethanol, i. e., 80 parts ethanol and 20 parts water. A film prepared by casting a solution of this polymer was tough and transparent.

The mother liquor was fractionated in a batch still equipped with an efficient packed column and a refrigerated condenser. The first part of the methyl formate cut, equivalent to the formic acid used in the reaction step, was distilled at a reflux ratio of about 10 to 1. This cut was relatively pure ester and contained in excess of 99.5% methyl formate by analysis. The balance of the ester was distilled more rapidly and was less pure, containing 98% methyl formate with small amounts of methanol, formaldehyde, and methylal. This material corresponded in quantity to the ester employed in the precipitation step and was suitable for re-use in that connection. A small methylal fraction was then taken off and the distillation halted when the head temperature reached 50° C. The still pot liquor, which was free of solid up to this point, was cooled and allowed to stand for 48 hours. The formic acid left unesterified in this liquor amounted to only 3.3% of that used as solvent in the reaction step. The polymer which precipitated on standing was removed by filtration and the filtrate distilled first under normal pressure to remove methanol and then under a pressure of 60 lbs./sq. in. gauge. In excess of 85% of the formaldehyde in the filtrate was obtained in the pressure distillate as a 36% solution.

Example II

A solution of 1 part of polyhexamethylene adipamide (intrinsic viscosity about 1.0) in 2 parts of 90% formic acid was made at 60° C. and one-third part of ethyl formate added. A second solution containing 0.96 part formaldehyde, 0.23 part water, 1.44 parts ethyl alcohol, and sufficient sodium hydroxide to make alkaline to litmus was made and heated to 60° C. The second solution was added to the first over a 3.5 minute period with good agitation and the reaction mixture was held at 60° C. Twenty-five minutes after addition of the aldehyde solution 1.44 parts of ethyl alcohol was added rapidly and the reaction continued for 5 minutes, making a total reaction time of ½ hour.

The reaction mixture was transferred to a precipitation tank and 26.5 parts of ethyl formate was added with good agitation. The polymer, N-ethoxymethyl polyhexamethylene adipamide, was thrown out as a fine, granular precipitate which hardened after slurrying for 15 minutes and was isolated by centrifugation. After washing and drying its ethoxyl content was 9.2%.

The mother liquor was batch distilled, following the general procedure used in Example I, and the formic acid was thus recovered as ethyl formate.

Example III

One part of an interpolymer prepared by polymerization of hexamethylenediammonium adipate (30 parts) and hexamethylenediammonium sebacate (70 parts) was dissolved in 4 parts of glacial acetic acid by heating at 80° C. To this solution was added with good agitation a solution containing 0.96 part formaldehyde, 2.0 parts ethyl alcohol, 0.17 part of water, and sufficient sodium hydroxide to make alkaline to litmus. This reaction mixture was held at 80°–82° C. for 30 minutes. Twenty-seven parts of ethyl acetate were then poured into the reaction mixture with good agitation and a granular product, N-ethoxymethyl polyamide, precipitated. The polymer was isolated by centrifugation. The mother liquor was batch distilled and ethyl acetate taken off as azeotropic mixtures with alcohol and alcohol and water. During the course of the distillation 6 parts of ethyl alcohol and 3.33 parts of water were added to the still pot. Toward the end of the distillation 0.03 part of $H_2SO_4$ was added to promote esterification. Ninety per cent of the acetic acid used in the reaction step was recovered as ethyl acetate.

The precipitant, as previously indicated, need not be pure ester. Acetals are usually formed in the reaction step and in some cases are rather difficult to separate completely from the esters by distillation. Complete separation is unnecessary. For example, the methyl formate fraction used to precipitate N-methoxymethyl polyhexamethylene adipamide may contain up to at least 30% methylal without impairing the precipitation efficiency.

As much as 75% of the precipitant ester can be replaced with water once the reaction mixture has been extended, but not precipitated, by addition of ester. While a product of good physical form can be obtained, this method is less satisfactory than the use of a straight ester fraction throughout, because the dissolved polymer has a greater tendency to throw out during mother liquor distillation and the acid recoveries are lower due to incomplete esterification.

Usually sufficient alcohol is used in the reaction step to esterify the solvent acid. In cases where there is a deficiency, alcohol may be added prior to or during distillation.

If an acid catalyst, e. g., sulfuric acid, is added to the mother liquor together with sufficient alcohol, the formaldehyde may be recovered as an acetal, such as methylal. This is generally undesirable unless the acetal is wanted as a by-product since the N-alkoxymethyl polyamide is hydrolyzed and the parent polyamide is precipitated during distillation. On the other hand, it is sometimes advantageous to add sulfuric acid to the still pot residue after ester removal and to boil for a short time under total reflux. This procedure facilitates precipitation of the polymer but the polymer loses its alkoxymethyl and methylol groups and reverts to the insoluble parent polyamide. The acid may then be neutralized, the polymer isolated, and distillation resumed to recover alcohol and concentrate aldehyde. This procedure of boiling with acid catalyst and insolubilizing the polymer may be used at any stage in the distillation and is particularly useful in systems which esterify less readily in the absence of catalyst than do formic acid and methyl alcohol.

It is preferred to carry out the precipitation step in a vessel equipped with a simple agitator, such as a rotating paddle, since this gives a fine granular product with relatively inexpensive equipment but any device which gives good agitation or good mixing may be used.

The alkyl ester obtained by esterification of the solvent acid can be used for other purposes or the ester can be hydrolyzed to the alcohol and acid which may be re-used in the reaction step. The distillation residue left after removal of ester, acetal, alcohol, and polymer is a water solution of formaldehyde which can be used as such or be concentrated by well known methods.

A high degree of completeness in the precipitation can be obtained by the practice of this invention. When a reaction mixture of methoxymethyl polyhexamethylene adipamide having about 35% of the amide groups substituted is made by the reaction schedule previously outlined, and precipitated with methyl formate by the preferred procedure, precipitation is about 95% complete. The efficiency is a function of the amount of precipitant employed and can, for example, be increased to 98% by using 26.5 parts of methyl formate instead of 22.5 parts as indicated in the previously outlined procedure. The ester requirements for a given percentage precipitation vary with the degree of amide substitution and the amount of free acid and alcohol in the completed reaction mixture. More precipitant is needed as the degree of substitution and consequently the solubility of the polymer is increased. These general considerations also apply to reaction systems of alkoxymethyl polyamides other than methoxymethyl polyhexamethylene adipamide.

This invention is directed to the preparation of N-alkoxymethyl polyamides by the new methods outlined herein for the precipitation and isolation of the polymer. The preparation of the reaction mixtures which are involved in the practice of this invention is accomplished by reacting an acid solution of polyamide with formaldehyde and an alcohol by previously used methods. A method that has been generally used consists in preparing a 20-35% solution of a polyamide, such as polyhexamethylene adipamide or polyhexamethylene sebacamide, in formic acid at 60° C., adding a solution of formaldehyde in an alcohol, and holding the mixture at 60° C. for about 30 minutes. The reaction temperatures can, however, range from as low as 50° C. up to the boiling point of reaction mixture. When a higher boiling acid and alcohol are used or when the reaction is carried out under pressure, temperatures as high as 150° C. can be used. A large excess of aldehyde and alcohol (e. g., 1 part formaldehyde and 2 parts alcohol per part of polyamide) is preferably used. Another method consists in adding in two or more portions as in the examples. By this method the degree of substitution can be controlled by the interval at which the second portion is added after the start of the reaction with the first or initial portion. The amide groups of the original polyamide are not necessarily all converted to N-alkoxymethyl groups, and this substitution will include appreciable methylol groups unless precautions are taken to eliminate them. Portionwise addition of alcohol is one method for decreasing the methylol content. The wide range in substitution possible can also be controlled by the amount of formaldehyde used and the amount of water present in the reaction system.

The improved method described herein for obtaining the N-alkoxymethyl polyamides is most advantageously applied to reaction mixtures made under conditions where not more than 45% of the amide groups are substituted. In obtaining the best results it is also desirable to use reaction mixtures containing the polyamide dissolved in 90% formic acid. The present process, however, is effective regardless of the means employed to control the degree and type of substitution and can be carried out with any concentration of the formic acid which is a solvent for the polyamide as well as with acids and alcohols other than those previously mentioned.

Acids especially useful as solvents for the initial polyamide are such oxygen-containing monobasic carboxylic acids as acetic, chloroacetic, hydroxyacetic, propionic, and benzoic acids.

Alcohols that can be used in place of those mentioned in the examples include ethanol, isopropanol, butanol, allyl alcohol, benzyl alcohol, and ethylene glycol. The esters used to precipitate the polymer can likewise be that of any of these alcohols with any of the above mentioned acids. Thus, if the interpolyamide of Example III is dissolved in acetic acid and reacted with formaldehyde and butyl alcohol, the resulting N-butoxymethyl polyamide can be precipitated with butyl acetate and the acetic acid and part of the butyl alcohol recovered as this ester.

The initial polyamides used in making the N-alkoxymethyl polyamides in accordance with the present process are, as has been previously the case in the manufacture of these modified polyamides, the readily available polyamides, such as polyhexamethylene adipamide and polyhexamethylene sebacamide. The initially used polyamide, however, can be any polymer having hydrogen-bearing amide groups (including carbonamides, thioamides and sulfonamides), and hence include polyesteramides and other linear polymers obtained by including in the reaction mixture linear polymer-forming reactants in addition to the polyamide-forming reactants described in the patents previously referred to. Thus the polyamides used in the practice of this invention in making the N-alkoxymethyl polyamides comprise, generally speaking, the reaction product of a linear polymer-forming composition containing amide-forming groups, for example, reacting material consisting essentially of bifunctional molecules each containing two reactive groups which are complementary to reactive groups in other molecules and which include complementary amide-forming groups.

The initially used polyamides of the kind mentioned above can be obtained by the methods given in the previously mentioned patents and by other methods, for example, by self-polymerization of a monoaminomonocarboxylic acid, by reacting a diamine with a dibasic carboxylic acid in substantially equimolecular amounts, or by reacting a monoaminomonohydric alcohol with a dibasic carboxylic acid in substantially equimolecular amounts, it being understood that reference herein to the amino acids, diamines, dibasic carboxylic acids, and amino alcohols is intended to include the equivalent amide-forming derivatives of these reactants. The preferred polyamides obtained from these reactants have a unit length of at least 7, where "unit length" is defined as in United States Patents 2,071,253 and 2,130,948, and an intrinsic viscosity of at least 0.4. The average number of carbon atoms separating the amide groups in these polyamides is at least two. On hydrolysis with hydrochloric acid the amino acid polymers yield the amino acid hydrochloride, and the diamine-dibasic acid polymers yield the diamine hydrochloride and the dibasic carboxylic acid, and the amino alcohol-dibasic acid polymers yield the amino alcohol hydrochloride and the dibasic carboxylic acid.

This invention, as has been previously pointed out, presents valuable improvements and economies in the manufacture of the N-alkoxymethyl polyamides. The use of an ester precipitant makes possible the production of the polymer in a better form as a fast settling fine granular precipitate which is easily separated from the reaction mixture. In the further specific embodiment of using as the precipitant an ester having the acid radical of the acid used to dissolve the polymers and having the alkyl radical of the reacting alcohol, the acid and alcohol ingredients are all recovered through the procedure described herein as the same ester as that used to precipitate the N-alkoxymethyl polyamide.

Since the N-alkoxymethyl polyamides can be dissolved in the inexpensive and readily available solvents, such as aqueous ethanol and methanol-chloroform mixtures, these polymers are adapted to the manufacture of coated products, self-supporting films, electrical insulation, adhesives, and impregnating agents. These modified polyamides can also be spun into filaments, fibers, and bristles. A valuable property of these modified polyamides is that they are converted by protracted heating into insoluble, infusible products.

As many apparently widely different embodimenst of this invention may be made without departing from the spirit and scope thereof, it is to be understood that I do not limit myself to the specific embodiments thereof except as defined in the appended claims.

I claim:

1. A process for making N-alkoxymethyl polyamides which comprises heating formaldehyde and an aliphatic alcohol consisting of an alkyl group and an hydroxyl group with a solution in monobasic carboxylic acid of a linear polycarbonamide which has hydrogen-bearing amide groups as an integral part of the polymer chain and in which the average number of carbon atoms separating the amide groups is at least two, and then precipitating the N-alkoxymethyl polyamide with an ester composed of the same acid radical as that of the acid comprising the solvent for said polyamide and the same alkyl-radical as the alcohol with which said solution of polyamide was reacted, said monobasic carboxylic acid being selected from the group consisting of acetic, chloroacetic, hydroxyacetic, propionic and benzoic acids.

2. A process for making N-alkoxymethyl polyamides which comprises heating formaldehyde and an aliphatic alcohol consisting of an alkyl group and an hydroxyl group with a solution in monobasic carboxylic acid of a linear polycarbonamide which has hydrogen-bearing amide groups as an integral part of the polymer chain and in which the average number of carbon atoms separating the amide groups is at least two, then precipitating the N-alkoxy-methyl polyamide with an ester composed of the same acid radical as that of the acid comprising the solvent for said polyamide and the same alkyl radical as the alcohol with which said solution of polyamide was reacted, and isolating the precipitated N-alkoxymethyl polyamide, said monobasic carboxylic acid being selected from the group consisting of acetic, chloroacetic, hydroxyacetic, propionic, and benzoic acids.

3. A process for making N-alkoxymethyl polyamides which comprises heating formaldehyde and an aliphatic alcohol consisting of an alkyl group and an hydroxyl group with a solution in formic acid of a linear polycarbonamide which has hydrogen-bearing amide groups as an integral part of the polymer chain and in which the average number of carbon atoms separating the amide groups is at least two, and then precipitating the N-alkoxymethyl polyamide from the reaction mixture with an alkyl formate in which the alkyl radical is that of said aliphatic alcohol.

4. A process for making N-alkoxymethyl polyamides which comprises heating formaldehyde and an aliphatic alcohol consisting of an alkyl group and an hydroxyl group with a solution in formic acid of a linear polycarbonamide which has hydrogen-bearing amide groups as an integral part of the polymer chain and in which the average number of carbon atoms separating the amide groups is at least two, then precipitating the N-alkoxymethyl polyamide from the reaction mixture with an alkyl formate in which the alkyl radical is that of said aliphatic alcohol, and isolating the precipitated N-alkoxymethyl polyamide.

5. The process set forth in claim 1 in which said linear polyamide in solution in said acid is one which yields a dibasic carboxylic acid and a diamine hydrochloride on hydrolysis with hydrochloric acid.

6. The process set forth in claim 1 in which said linear polyamide in solution in said acid comprises polyhexamethylene adipamide.

7. The process set forth in claim 1 in which said linear polyamide in solution in said acid comprises ployhexamethylene sebacamide.

8. The process set forth in claim 1 in which said alcohol is methanol and said acid is formic acid.

9. The process set forth in claim 3 in which said linear polyamide in solution in formic acid comprises polyhexamethylene adipamide.

10. The process set forth in claim 3 in which said linear polyamide in solution in formic acid comprises polyhexamethylene sebacamide.

11. A process for making N-methoxymethyl polyhexamethylene adipamide which comprises heating formaldehyde and methyl alcohol with a solution in formic acid of polyhexamethylene adipamide, and then precipitating the N-methoxymethyl polyhexamethylene adipamide from the reaction mixture with methyl formate.

12. A process for making N-methoxymethyl polyhexamethylene sebacamide which comprises heating formaldehyde and methyl alcohol with a solution in formic acid of polyhexamethylene sebacamide, and then precipitating the N-methoxymethyl polyhexamethylene sebacamide from the reaction mixture with methyl formate.

ARTHUR W. LARCHAR.